Aug. 25, 1959 V. A. MOCAS 2,901,527
BATTERY CELL COVER
Filed May 28, 1958
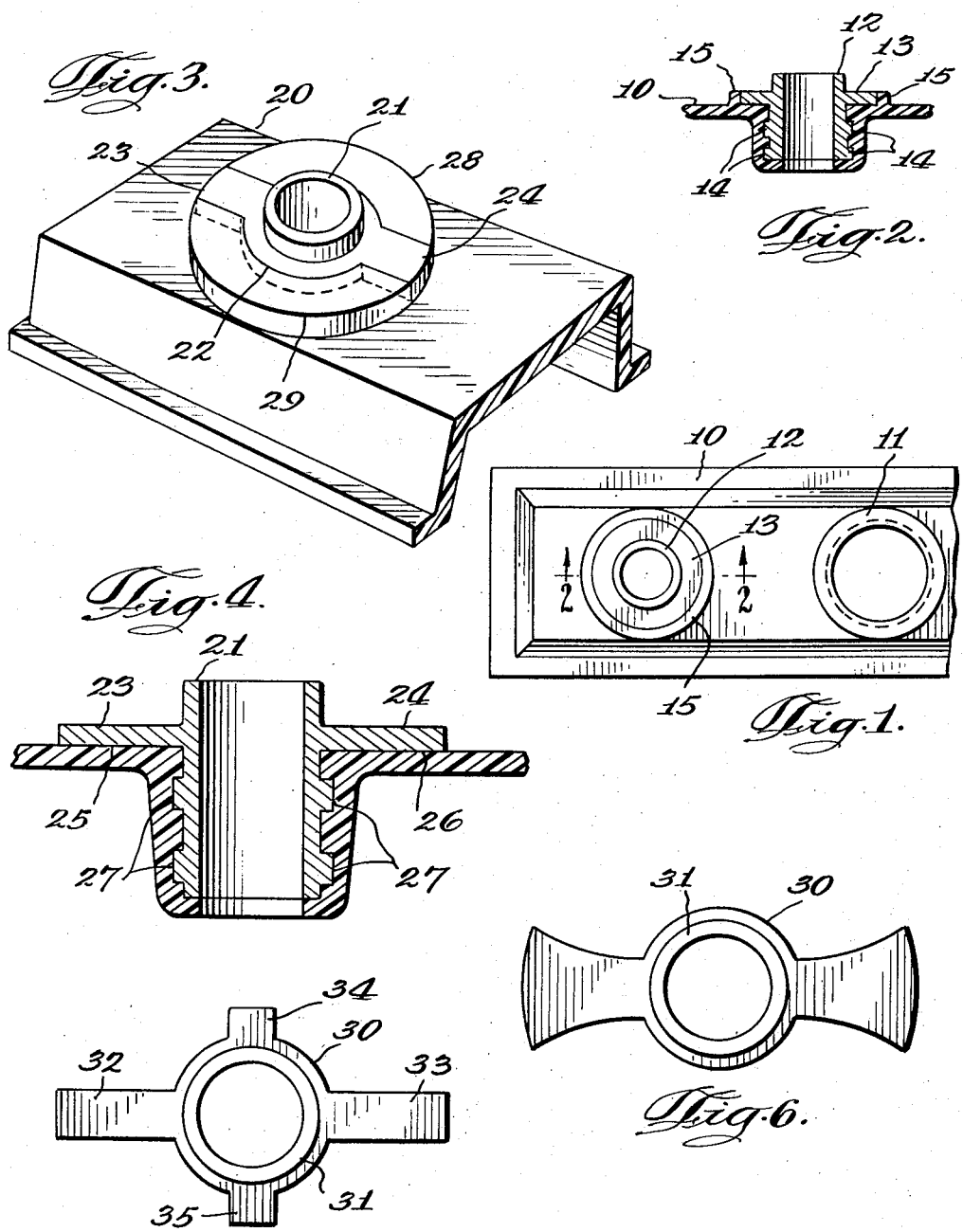
INVENTOR.
Verlin A. Mocas
BY John L. Hutchinson
Attorney United States Patent Office 2,901,527
Patented Aug. 25, 1959

2,901,527

BATTERY CELL COVER

Verlin A. Mocas, Indianapolis, Ind., assignor to The Richardson Company, Melrose Park, Ill., a corporation of Ohio Application May 28, 1958, Serial No. 738,335

8 Claims. (Cl. 136—168)

This invention relates to a battery cell cover and, more particularly, to an improved means for more firmly anchoring a terminal post lead bushing within the body of the cover.

The usual electric storage battery contains a plurality of individual cells formed in a single casing. Each cell includes a plate and separator assembly together with electrolyte. Extending upwardly from the plates and through the cell cover is a terminal post to which external connections may be made. There has been some tendency to make batteries using a so-called one-piece cover for all cells, however, the majority of batteries have an individual cover for each cell.

Cell covers are normally molded from an appropriate plastic composition, usually rubber, in view of its impact and acid resistance. In molding a cell cover, it is customary to insert a cylindrical lead bushing at an appropriate position in the mold, whereby, as the cover is molded, the molding composition is forced around a portion of the insert locking or anchoring the same to the cover as an integral assembly. When the cover is applied over the cell of a battery, the lead terminal post of the plates contained within the cell is inserted upwardly through the lead bushing and subsequently fused or burned to the bushing to form a permanent metallic connection. Lugs of connecting straps may then be placed over the upper portion of the bushing providing electrical connectors from the plates to a desired point. Normally, the lead bushing is formed with a plurality of projections along the lower portion of its external surface and, in addition, is also provided with a laterally extending flange near its upper extremity, the flange usually having a circular configuration and extending around the outer periphery of the bushing. In molding, the molding composition is forced around the aforementioned projections and sides of the flange, whereby they are imbedded into the body of the molded cell cover mechanically anchoring the bushing within the cover.

While the foregoing construction has, in general, proved adequate, there has been a tendency, from time to time, for the lead bushing to work loose from the body of the cover under continuing vibration, characteristic of the usual automotive vehicle in which a battery is contained. Further, installation and removal of the battery from service may, likewise, tend to loosen the bushing. The loosening of the bushing, correspondingly, permits movement of the plate terminal post as well as the plates within the cell and, over a period of time, will tend to affect the physical structure and relative position of the plates. Additionally, if the bushing is separated from the surrounding cover, acid electrolyte may seep from the cell causing corrosion.

Accordingly, it is the principal object of this invention to provide additional means, associated with the metallic terminal post bushing extending through a battery cell cover, whereby the bushing is anchored more firmly within the cover and has less tendency to work loose.

Another object is to provide additional locking means for a terminal post bushing within a cell cover which will not appreciably affect present methods of manufacturing such bushings or increase the cost of making such bushings. These and other objects will become more apparent from the accompanying drawing and the following specification.

In the accompanying drawing, Figure 1 is a fragmentary plan of a cell cover provided with a lead bushing of the type currently in use.

Figure 2 is a sectional elevation taken along line 2—2 of Figure 1.

Figure 3 is a fragmentary perspective of a cell cover provided with one form of an improved bushing contemplated by this invention.

Figure 4 is a fragmentary sectional elevation of the bushing and surrounding body of the cover.

Figure 5 is a plan of another modification of a bushing.

Figure 6 is a plan of a further modification of the bushing.

Turning now to the drawings and, in particular, to Figures 1 and 2, the numeral 10 indicates the main body of a cell cover. As previously indicated, cell covers are molded from an appropriate plastic material, preferably rubber. The cell cover is provided with a filling well 11 which normally contains threads adapted to be engaged with a complementary threaded vent cap. Electrolyte or water, as required, may be added to the cell through the filling well. The terminal post lead bushing 12, of the type commonly employed in cell covers, is shown in position within the cover body. This bushing is provided with a circular flange 13 and a plurality of ribs or projections 14 extending laterally from its lower extremity. As the cover is formed in the mold, the molding composition is forced tightly against the sides of the bushing and into recesses between the projections 14 to obtain a relatively firm connection with the bushing. In addition, the mold is constructed so as to provide for the formation of molding composition 15 flush with the upper surface but extending completely around the sides of the circular flange 13 of the bushing.

As previously indicated, a structure of the foregoing type has been found suitable but does tend to have certain disadvantages under conditions wherein unusual vibration or other motion occurs with respect to the vehicle in which a battery is held. Accordingly, to overcome these disadvantages, the lead bushing has been modified to provide additional anchoring means, as is illustrated in Figures 3 to 6. The numeral 20 indicates the main body of the cell cover and the numeral 21 a modified lead bushing held integrally therein. Lead bushing 21 is provided with the customary laterally extending flange 22. Extending from the flange 22 are two oppositely disposed lateral projections 23 and 24. The under surfaces of projections 23 and 24 are adapted to rest on or be substantially flush with the upper surface of the main body of the cell cover as indicated by the numerals 25 and 26, respectively. In accordance with customary practice, a plurality of ribs or projections 27 are also provided on the lower external surface of the bushing for additional mechanical locking of the bushing to the cover.

In order to have the laterally extending projections 23 and 24 serve their desired purpose of providing additional anchoring means, it is necessary, during the molding of the cover, to have a portion of the molding composition formed around at least the sides of the flange and projections, the ends of the projections being left uncovered, if desired. This additional portion of the cover body formed about the opposite sides of the flange and projections are indicated by the numerals 28 and 29. In order to insure that lugs of connecting straps which are subsequently applied over the bushing are not prevented from making good contact with the metallic bushing and its flange, the portions 28 and 29 of the cover body are preferably formed so as to be substantially flush with but not extend over the upper surfaces of the projections 23 and 24 and flange 22. While two laterally extending projections have been shown, it is, of course, possible to use only one such projection and still obtain an improved anchoring of the bushing within the cover.

It can be seen that the relatively large projections 23 and 24 of the flange 22, when imbedded in a part of the cell cover as indicated, will greatly enhance the mechanical anchoring of the bushing within the cover and reduce the tendency of the bushing to become loosened.

A modification of the bushing of Figures 3 and 4 is shown in Figure 5. In this figure, the flange 30 of the bushing 31 is provided with four laterally extending projections substantially equally spaced about the periphery of the flange. As indicated, two of the projections, namely projections 32 and 33 are somewhat longer than are the projections 34 and 35. While a bushing such as is described in Figure 5 may be used with various types of covers, its use is primarily advantageous with a cell cover having one dimension considerably longer than the other, which is characteristic of the usual individual cell cover for the ordinary six or twelve volt battery. The additional flanges of Figure 5, when disposed in portions of the cover body extending upwardly from the main cover body and around their sides in a manner similar to that illustrated in connection with the modified bushing of Figure 3, will provide even more of a locking means against loosening of the bushing.

Figure 6 illustrates a still further modification of the lead bushing, the numerals 30 and 31 indicating, respectively, the flange and main body of the bushing. This modification demonstrates that the lateral projections extending from the flange may be formed so as to have various configurations tending to improve the locking characteristics of the projections with respect to those portions of the cell body molded around the projections. While it has been found preferable to provide the bushing with the customary circular-like flange, the lateral projections could extend directly from the external surface of the bushing and the flange eliminated.

Another advantage of the bushings contemplated by this invention is that the presence of the projections extending from the flange provides additional surface for contact with connecting lugs thereby improving the electrical connection between the bushings and the lugs.

Having disclosed certain embodiments of the invention, the same is only intended to be limited by the scope of the following claims.

I claim:

1. A molded battery cell cover having a main body portion and a raised portion, a terminal post aperture extending through said body and said raised portions, a metallic bushing disposed in said aperture and adapted to receive a terminal post, said bushing comprising a cylindrical sleeve, a plurality of laterally extending ribs, and a surface flange, said plurality of laterally extending ribs being disposed at substantially equidistant longitudinal positions along a periphery of the lower portion of the cylindrical sleeve and being integrally connected thereto and adapted to be embedded within the main body portion of said molded battery cell cover, said surface flange consisting of a laterally extending flange and a plurality of laterally extending projections, said laterally extending flange being integrally connected to the upper portion of the cylindrical sleeve and said laterally extending projections being integrally and radially connected to the periphery of said laterally extending flange, the outermost edges of the plurality of laterally extending projections being disposed at a substantially greater radial distance than the radial distance of the outer edges of the plurality of laterally extending ribs, the lower surface of said laterally extending flange and said laterally extending projections being substantially flush with the upper surface of said main body portion of said cover, and said raised portion of the cover body extending upwardly along the sides and terminating flush with the upper surfaces of said flange and said projections, said raised portion of the cover body united with the laterally extending flange and the plurality of projections to form a substantially solid annular member integrally attached to the upper surface of said main portion of said battery cell cover, said flange and projections being firmly embedded in said cover and offering an exposed metallic support for a connecting strap lug terminal.

2. A cover as described in claim 1, wherein said laterally extending flange has two oppositely disposed projections extending laterally from the periphery thereof.

3. A cover as described in claim 1, wherein said laterally extending flange has four radially connected projections positioned substantially equidistant around the periphery of said flange.

4. A cover as described in claim 1, wherein at least one of said laterally extending projections is of shorter radial length than the remainder of said projections.

5. A cover as described in claim 1, wherein the width of at least one of said laterally extending projections becomes increasingly larger toward its outer extremity.

6. A molded battery cell cover having a main body portion and a raised portion, a terminal post aperture extending through said portions, a metallic bushing disposed in said aperture and adapted to receive a terminal post, said bushing comprising a cylindrical sleeve, a plurality of laterally extending ribs and a plurality of laterally extending projections, said plurality of laterally extending ribs being disposed at substantially equidistant longitudinal positions along the periphery of the lower portion of the cylindrical sleeve and being integrally connected thereto and adapted to be embedded within the body of said main portion of said molded battery cell cover, said plurality of laterally extending projections being integrally and radially connected to the upper periphery of the cylindrical sleeve, the outermost edges of the plurality of laterally extending projections being disposed at substantially greater radial distance than the radial distance of the outer edges of the plurality of laterally extending ribs, the lower surface of said laterally extending projections being substantially flush with the upper surface of said main body portion of said cover, said raised portion of the cover body extending upwardly along the sides and terminating flush with the upper surfaces of said projections, said raised portion of the cover body united with the plurality of laterally extending projections to form a substantially solid annular member integrally attached to the upper surface of said main body portion of said battery cover, said projections being firmly embedded in said cover and offering an exposed metallic support for a connecting strap lug terminal.

7. A molded battery cell cover having a main body portion and a raised portion, a terminal post aperture extending through said body and said raised portion, a metallic bushing disposed in said aperture and adapted to receive a terminal post, said bushing comprising a cylindrical sleeve, and a surface flange, said surface flange consisting of a laterally extending flange and a plurality of laterally extending projections, said laterally extending flange being integrally connected to the upper portion of the cylindrical sleeve and laterally extending projections being integrally and radially connected to the periphery of said laterally extending flange, the outermost edges of the plurality of laterally extending projections being disposed at a substantially greater radial distance than the radial distance of the outer edge of the laterally extending flange, the lower surface of said laterally extending flange and said laterally extending projections being substantially flush with the upper surface of said main body portion of said battery cell cover, and said raised portion of the cover body extending upwardly along the sides and terminating flush with the upper surfaces of said flange and projections, said raised portion of the cover body united with the laterally extending flange and the plurality of projections to form a substantially solid annular member integrally attached to the upper surface of said main body portion of said battery cell cover, said flange and projections being firmly embedded in said cover and offering an exposed metallic support for a connecting strap lug terminal.

8. A molded battery cell cover having a main body portion and a raised portion, a terminal post aperture extending through said portions, a metallic bushing disposed in said aperture and adapted to receive a terminal post, said bushing comprising a cylindrical sleeve, and a plurality of laterally extending projections, said projections being integrally and radially connected to the periphery of the upper portion of said cylindrical sleeve, the outermost edges of said projections being disposed at a substantially greater radial distance than the outside diameter of the cylindrical sleeve, the lower surface of said laterally extending projections being substantially flush with the upper surface of said main body portion of said battery cell cover, said raised portion of the cover body extending upwardly along the sides and terminating flush with the upper surface of said projections, said raised portion of the cover body united with the laterally extending projections to form a substantially solid annular member integrally attached to the upper surface of said main body portion of said battery cell cover, said projections being firmly embedded in said cover and offering an exposed metallic support for a connecting strap lug terminal.

References Cited in the file of this patent

UNITED STATES PATENTS

| | | |
|---|---|---|
| 1,248,768 | Willard | Dec. 4, 1917 |
| 1,411,414 | Cook | Apr. 4, 1922 |
| 1,447,797 | Loudon | Mar. 6, 1923 |
| 2,148,738 | Feldtkeller | Feb. 28, 1939 |
| 2,242,599 | Raney | May 20, 1941 |
| 2,512,080 | Wilson | June 20, 1950 |